R. ALLISON.
Feed Screw and Nut for Rock-Drills, &c.

No. 206,067. Patented July 16, 1878.

Witnesses:
P. C. Dietrich
Frank H. Duffy

Inventor:
Robert Allison
Per C. H. Watson & Co. Attorneys.

UNITED STATES PATENT OFFICE.

ROBERT ALLISON, OF PORT CARBON, PENNSYLVANIA.

IMPROVEMENT IN FEED SCREWS AND NUTS FOR ROCK-DRILLS, &c.

Specification forming part of Letters Patent No. 206,067, dated July 16, 1878; application filed June 27, 1878.

*To all whom it may concern:*

Be it known that I, ROBERT ALLISON, of Port Carbon, in the county of Schuylkill and State of Pennsylvania, have invented certain new and useful Improvements in Feed Screws and Nuts; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a device for taking up the lost motion and wear of feed screws and nuts for rock-drills, lathe-rests, and any other screws that require to be operated without lost motion in the nut.

Figure 1:
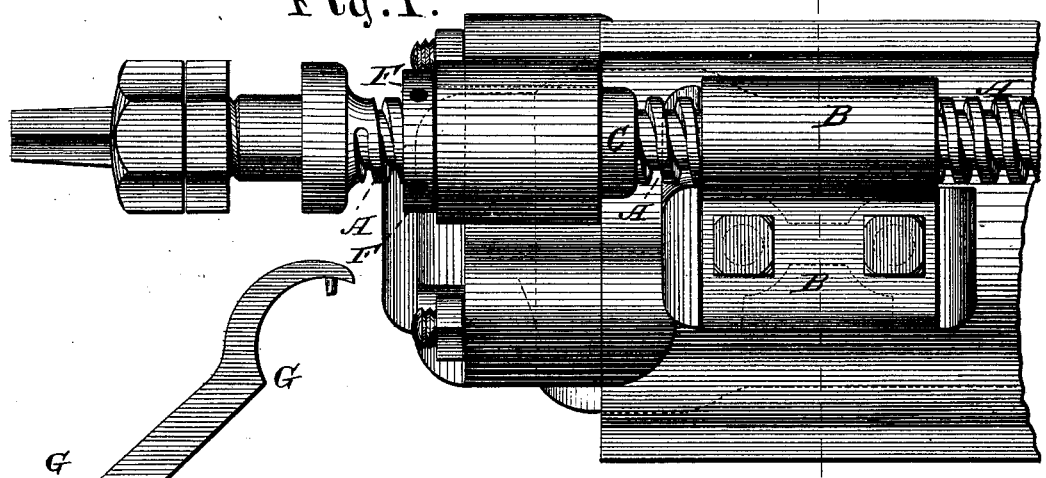
Figure 2:
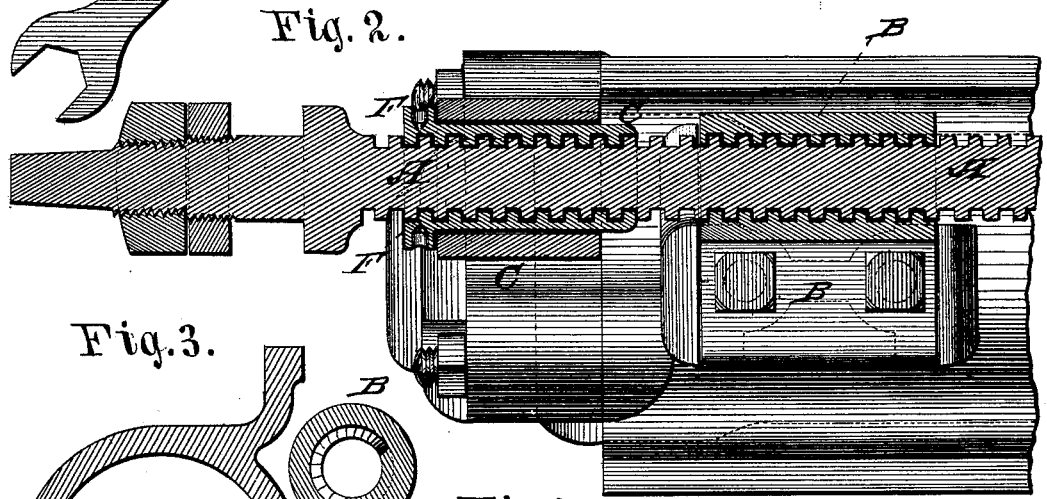
Figure 3:
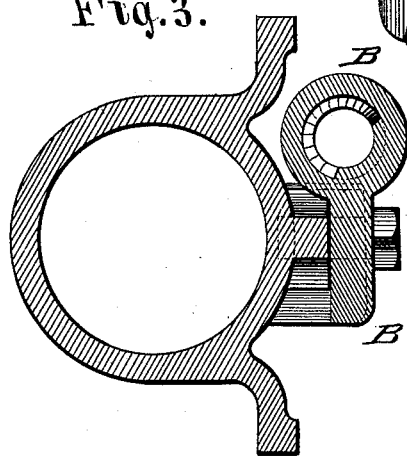
Figure 4:
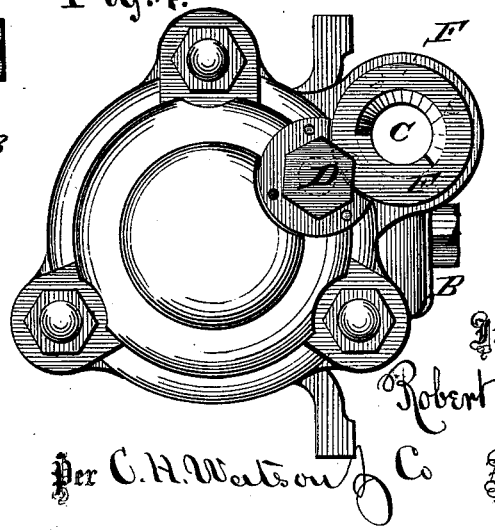

In the annexed drawing, to which reference is made, and which fully illustrates my invention, Figure 1 is a side view of my invention. Fig. 2 is a longitudinal section, Fig. 3 a transverse section, and Fig. 4 an end view, of the same.

A represents the feed-screw, which passes through the fixed nut B, and also through an adjustable sleeve-nut, C, as shown, said sleeve-nut being held in position by means of a screw, D, which bears against a collar, F, on the end of the nut C. These parts are so arranged that the thread on the screw will abut against the thread of the fixed nut on one side, and against the thread of the adjustable sleeve-nut on the other side, so that the wear of the screw and nuts can be taken up and allow no lost motion until the threads are entirely worn out.

When the threads in the nuts and screw become worn the set-screw D is loosened, and the nut C turned with an ordinary spanner-wrench, G, until the lost motion is taken up. This can be done until the threads of the screw and nuts are entirely worn out.

This device is particularly applicable to the feed-screws of reciprocating rock-drills, from the fact that when the feed-screw gets slightly worn the cylinder begins to jiggle back and forth on the guideways, and soon pounds the thread off the screw or breaks the fastenings.

The invention is also applicable to lathe-rests, and any other screws that require to be operated without lost motion.

Having thus fully described my invention, what I claim as new, and desire to secure by Letters Patent, is—

The combination of the screw A, the fixed nut B, the adjustable sleeve-nut C, with collar F, and the set-screw D, substantially as and for the purposes herein set forth.

In testimony that I claim the foregoing as my own I have hereto affixed my signature in presence of two witnesses.

ROBT. ALLISON.

Witnesses:
  WM. McQUADE,
  W. W. TURNER.